United States Patent [19]
Cottam

[11] Patent Number: 5,480,544
[45] Date of Patent: Jan. 2, 1996

[54] BELT FILTERS

[75] Inventor: Alan Cottam, Blackburn, Great Britain

[73] Assignee: Profit Improvement and Engineering Limited, Lancs, United Kingdom

[21] Appl. No.: 244,578
[22] PCT Filed: Dec. 3, 1992
[86] PCT No.: PCT/GB92/02249
§ 371 Date: Aug. 23, 1994
§ 102(e) Date: Aug. 23, 1994
[87] PCT Pub. No.: WO93/11850
PCT Pub. Date: Jul. 24, 1993

[30] Foreign Application Priority Data

Dec. 5, 1991 [GB] United Kingdom .............. 9125863
Jun. 2, 1992 [GB] United Kingdom .............. 9211609

[51] Int. Cl.⁶ ............................................. B01D 33/04
[52] U.S. Cl. ...................... 210/304; 210/391; 210/400; 210/406
[58] Field of Search ........................... 210/400, 401, 210/297, 304, 391, 393, 406, 409, 416.1, 512.1

[56] References Cited

U.S. PATENT DOCUMENTS

| 636,762 | 11/1899 | Conley | 210/400 |
| 1,780,954 | 11/1930 | Tompkins | 210/400 |
| 2,619,232 | 11/1952 | Parsons et al. | 210/400 |
| 2,963,161 | 12/1960 | Holland | 210/401 |
| 4,285,816 | 8/1981 | Lee | 210/401 |
| 5,006,233 | 4/1991 | Muisener | 210/400 |
| 5,202,034 | 4/1993 | Martel, Jr. | 210/400 |

FOREIGN PATENT DOCUMENTS

| 3808968 | 9/1989 | Germany . |
| 9102171 | 6/1991 | Germany . |
| 2012179 | 7/1979 | United Kingdom . |
| 2212733 | 8/1989 | United Kingdom . |

Primary Examiner—Christopher Upton
Attorney, Agent, or Firm—Oliff & Berridge

[57] ABSTRACT

A liquid filtration apparatus for improved water handling capacity of a belt filter comprising a continuously movable filtering medium, an advancing length of which being immersible in a container of contaminated liquid, a driving device to move the filter medium through the contaminated liquid, a device for cleaning contaminates from the filtering medium and a device for removing cleansed liquid from the filter from above the filtering medium in the region of immersion in the contaminated liquid.

16 Claims, 3 Drawing Sheets

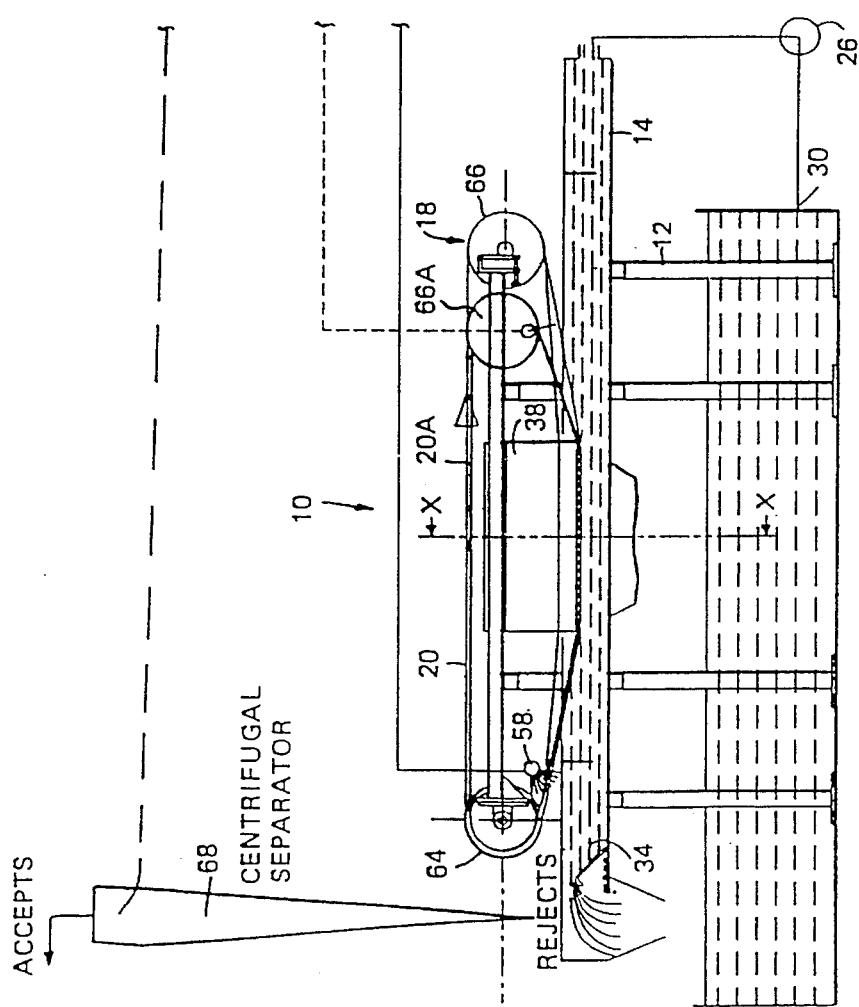

BELT FILTERS

This invention relates to a belt filter for removing contaminant from water or other liquids having a viscosity similar to that of water.

A common form of filter comprises a fine woven wire mesh which is static and is used as a gravity filter. The capacity of such a filter is restricted in its liquid handling capacity due to the surface tension that supports the droplets of liquid formed under the wire mesh. The smaller the droplets are the stronger the surface tension and the stronger the surface tension the bigger the resistance to flow through the filter. Also in such a situation the wire mesh will very quickly blind and close off or seriously restrict throughput of liquids to be filtered.

The present invention seeks to improve the water handling capacity of a belt filter by immersing the filter cloth in the liquid to be cleaned thereby removing surface tension, and moving the filter cloth through the contaminated liquid.

Accordingly the present invention provides a liquid filtration apparatus comprising an endless continuously movable filtering medium an advancing length of which medium being immersible in a container of contaminated liquid, driving means to move the filtering medium through the contaminated liquid, means for cleaning containments from the filtering medium and means for removing cleansed liquid above the filtering medium in the region of immersion in the contaminated liquid, where only the area of liquid extraction is submerged below the surface of the contaminated liquid, the filtering medium being shaped in cross-section in the region of immersion of the advancing length of the filtering medium in the contaminated liquid. Preferably the filtering medium comprises a wire mesh cloth belt.

The contaminated liquid container can have an inlet through which contaminated liquid is received and an outlet from which contaminated liquid is discharged and the level of contaminated liquid can be controlled by liquid level sensing means and a moveable weir located upstream of the outlet which functions in dependence of the signal from the liquid level sensing means.

The drive means can comprise two or more rubber covered rollers over which the endless filtering medium passes, one of the rollers being driven by a variable speed drive motor and another roller being adjustable in position to maintain tension in the filtering medium.

Preferably the drive roller is cambered.

The cleansed liquid removal means can comprise a syphon, the syphon including a syphon tube having a generally rectangular mouth in contact with the filtering medium in the contaminated liquid tank.

The filtering medium can comprise a pair of nested fine woven synthetic wire mesh cloth belts both arranged in the form of a dish in the region of immersion of the advancing length of the filtering medium in the contaminated liquid. The two belts can have a common drive roller but separate tensioning rollers.

The filtering apparatus can also include a centrifugal separator arranged to receive the cleansed liquid and to return rejected liquid to the contaminated liquid. The rollers can be supported above and clear of the contaminated liquid level, and the advancing length of the filtering medium is depressed by the mouth of the syphon, the syphon mouth being less in width than the filtering medium, thereby forcing the edges of the filtering medium to turn up and remain above the level of the contaminated liquid, the edges of the filtering medium being maintained in this position by contact straps on the sides of the container.

The mouth of the syphon tube can be provided with support bars in contact with the filtering medium, the support bars extending transversely to the direction of travel of the filtering medium.

The syphon has a drop leg terminating in a valve which can be controlled either by a ram and/or by a float.

The syphon includes a priming valve which allows clean water to be admitted into the syphon.

The cleansing means of the filtering medium can comprise a static array of water jets extending across the width of the filtering medium, and can also include a high pressure oscillating water jet.

The present invention will now be more particularly described with reference to the accompanying drawings in which;

FIG. 5 shows a front elevation of a modified form of liquid filtration apparatus according to the present invention, and FIG. 6 is a section on line X—X in FIG. 5.

Figure 2:
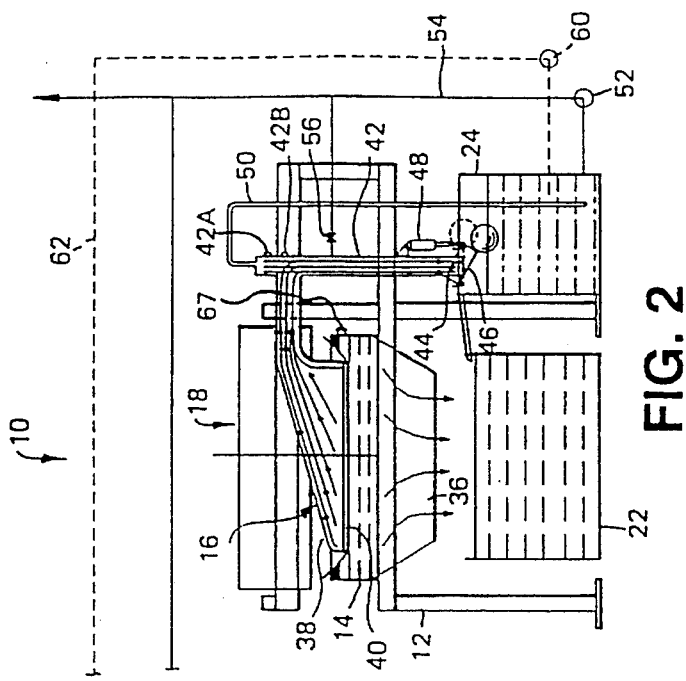
FIG. 2 shows a section on line X—X in FIG. 1.
Figure 1:
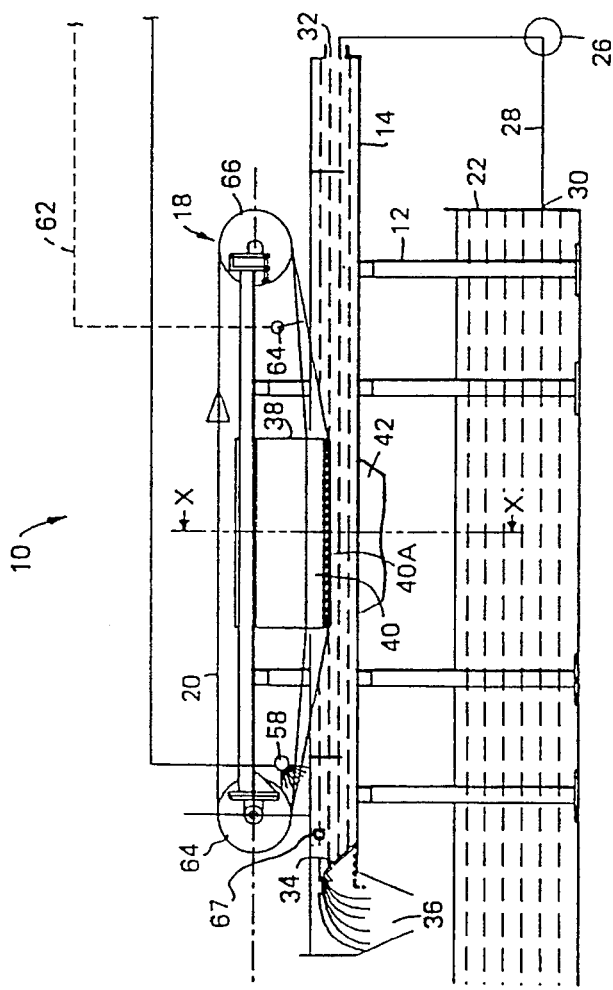
FIG. 1 shows a front elevation of one form of liquid filtration apparatus according to the present invention.
Figure 3:
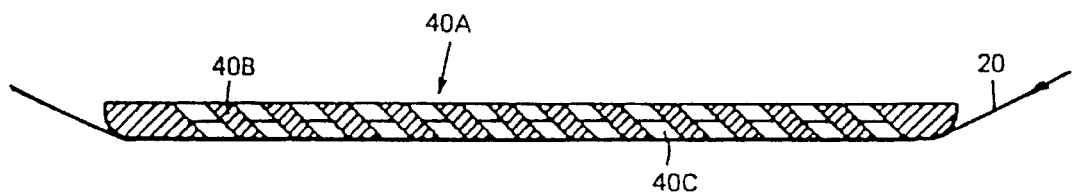
FIG. 3 shows a detail of the syphon mouth of the apparatus shown in FIGS. 1 and 2.
Figure 4:
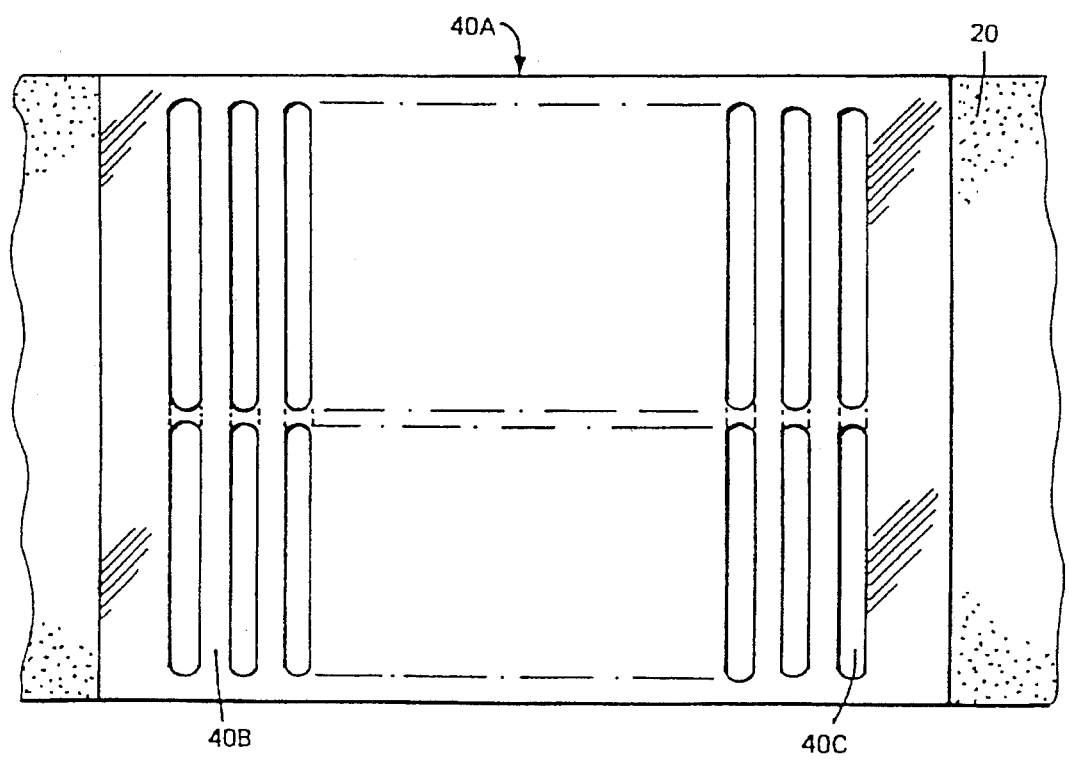
FIG. 4 shows a view on arrow A in FIG. 3.

Referring to the figures, a liquid filtration apparatus (10) suitable for the filtration of water or other liquids of a similar viscosity, comprises a framework (12) which supports a filtration tank (14), a syphon (16), and a drive means (18) for an endless wire mesh filter cloth belt (20). Tanks (22) and (24) respectively contain water to be filtered and filtered water, and both tanks are located under the framework (12) or at any convenient location.

For example the tank (22) can comprise the output from a process plant.

A pump (26) is connected in a pipeline (28) between outlet (30) of the tank (22) and inlet (32) of the tank (14). A movable weir (34) is provided upstream of the outlet (36) of the tank (14), the outlet (36) discharging into the tank or back to process (22).

The syphon (16) comprises a syphon tube (38) having a rectangular mouth (40) in contact with the filter cloth (20) and a drop leg (42) having an outlet (44). The outlet (44) is controlled by a ball-float valve (46), the position of which is controlled both by the level of water in the tank (24) and a ram (48) which is pneumatically operated. The upper end of the leg (42) has a level controller indicating high and low level liquid levels (42A) and (42B) respectively.

The syphon (16) also has a de-aerating drop leg (50) the lower end of which is immersed in the water in the tank (24). The opposite end of the leg (50) is connected to the uppermost section of the syphon.

A pump (52) is located in ducting (54) leading from the tank (24) to the syphon drop-leg (42) via a priming valve (56), to process duty or discharge, and to static cloth cleaning fan jets (58).

A further pump (60) and associated ducting (62) can be provided to supply clean water to a high pressure oscillating needle jet (64) to assist in the cleaning of the filter cloth (20).

The mouth (40) of the syphon tube (38) is provided with a plate (40A) formed with support bars (40B) which extend normal to the direction of travel of the filter cloth (20). The support bars define slots (40B) which are inclined at approximately 45° to scrape clean water from the surface of the filter cloth (20) and to direct it in an upward direction.

The drive means (18) comprises a pair of rubber covered rollers (64) (66). The roller (64) is in a fixed position, is cambered and provided with a variable speed drive motor (not shown). The roller (66) is movable relative to the supporting frame work (14) in order to maintain a substantially constant tension throughout the life of the wire cloth (20).

As will be seen from the figures, the wire cloth is held in position in the tank (22) by the mouth (40) of the syphon so that whilst the apparatus is in operation the filter cloth is submerged as it passes through the water to be cleaned.

A basin is created in the tank (14) by the edges of the filter cloth (20) being kept above the surface of the dirty water by means of high density plastic friction pads (68) which are secured to the sides of the tank (14).

In operation the pump (26) draws dirty water from the supply tank (22) and the dirty water is pumped into the filtration tank (14). Initially the weir (34) is raised and the filter cloth (20) which is being driven through the tank (14) by the drive roll (64) is submerged in the water in the tank (14). The syphon (16) is primed by lowering the weir (34) allowing water to be recycled into the tank (22) so that the level of water in the tank (14) is below the filter cloth (20). The pump (52) is operated and the priming valve (56) is opened pneumatically against a spring load in order to fill the syphon tube (38), whilst the valve (46) is closed by pneumatic operation of the ram (48). Any air in the syphon is forced out through the leg (50) which sealed with water and prevents air from re-entering the syphon. The surface tension at the mouth (40) of the syphon tube (38) supports the water in the syphon tube until the syphon is filled and the outlet valve is opened. When the syphon tube (38) is filled, the syphon high level outputs a signal which raises the weir (34) and the level of water in the tank (14) is raised so that the filter cloth (20) is submerged. For example, the level of water in the tank (14) can be 50–75 mm above the level of the filter cloth.

When the operating level (67) in the tank (14) has been reached the outlet valve (46) in the syphon down leg (42) is opened by switching off the air of the ram (48), the priming valve (56) is closed and the suction drop leg (42) begins to pull filtered water through the filter cloth and deposit it in the tank (24).

The moving filter cloth (20) and syphon (16) will continue to filter clean water from the dirty water in the tank (14) provided that there is a continuous supply of dirty water and that the flow potential through the filter cloth is greater than that of the outlet valve (46).

If the filter cloth starts to blind over with contaminants, the syphon level will fall to level (42B) and will output a signal for the speed of the filter cloth drive motor to increase thereby providing a cleaner mesh to the extraction area.

If the syphon should be broken, the syphon level will again fall to level (42B), the valve (46) is automatically closed by the pneumatic ram (48) and the priming cycle will be re-started.

Throughout the operation of the filtering apparatus (10) the contaminants which have been filtered from the dirty liquid will be washed from the filter cloth by water pumped through the fan jets (58) and through the oscillating needle jet (64) if provided.

An alternative to the primary arrangement above is a vacuum-induced priming. In which case the syphon drop leg does not have a valve. Instead the drop leg is submerged at its base in a container of cleansed liquid and control of extraction volume will be related to level differences between the tank (14) and tank (24).

A vacuum pump or fan would be necessary for the priming operation and valved-off when filter is in operation.

Referring to FIGS. 5 and 6 there is shown a liquid filtration apparatus similar to that described above except for the addition of two features. Instead of the single belt (20) there is provided a secondary belt (20a) both of the belts passing round the common drive roller (64). The auxiliary belt (28) is provided with a separate smaller diameter tension roller (66a).

This arrangement provides a further degree of security should any damage occur to one of the belts, or an odd shaped particle slip through the mesh of one of the belts at an angle of approach that exposes the greatest cross-sectional aperture.

The apparatus shown in FIGS. 5 and 6 is also provided with a centrifugal separator (68) which receives water from the tank (24) via the pump (52) and ducting (54). The centrifugal separator (68) is arranged to remove small particles and matter that have a higher specific gravity than water. The separator can be arranged on a partial or full flow of accepts. The provision of the separator would be for more critical applications where small abrasive particles could be detrimental to the ultimate use of the cleansed water. The rejects from the separator are returned to the dirty water trough (22).

I claim:

1. A liquid filtration apparatus comprising a continuously movable filtering medium, a container of contaminated liquid, means for depressing a section of the filtering medium so as to provide a dish shaped central portion immersed in the contaminated liquid and having elevated edges above the contaminated liquid, driving means for moving the filtering medium, including through the contaminated liquid in the aforesaid immersed region, means for removing cleansed liquid from above the immersed region of the filtering medium, and means for cleaning contaminants from the filtering medium, the means for removing cleansed liquid further comprising a syphon having a tube with a mouth which contacts the filtering medium and serves as the means for depressing the filtering medium.

2. An apparatus as claimed in claim 1, wherein the filtering medium further comprises a fine synthetic woven wire mesh belt.

3. An apparatus as claimed in claim 1, wherein the contaminated liquid container has inlet means for receiving contaminated liquid, outlet means for discharging concentrated contaminated liquid, a liquid level sensing means for controlling the contaminated liquid level, and a movable weir located upstream of the outlet means.

4. An apparatus as claimed in claim 1 in which the drive means comprises two or more rollers over which the filtering medium passes, one of the rollers being driven by variable speed drive motor and the other roller being adjustable in position to maintain tension in the filtering medium, all rollers being arranged above the level of the contaminated liquid and only a portion of the lower run of the belt is depressed into the liquid.

5. An apparatus as claimed in claim 4 in which the rollers are rubber covered and the drive roller is cambered.

6. An apparatus as claimed in claim 4, wherein the rollers are supported above and clear of the contaminated liquid level, the syphon mouth being less in width than the filtering medium thereby forcing the edges of the filtering medium to turn up and remain above the level of the contaminated liquid, and the edges of the filtering medium being maintained in this configuration by contact strips on the sides of the container.

7. An apparatus as claimed in claim 6 wherein the syphon includes a syphon tube having a generally rectangular mouth.

8. An apparatus as claimed in claim 7 in which the mouth of the syphon tube is provided with support bars in contact with the filtering medium.

9. An apparatus as claimed in claim 7 in which the syphon has a drop leg terminating in a valve.

10. An apparatus as claimed in claim 9 in which the valve can be operated by a ram and/or by a float.

11. An apparatus as claimed in claim 8 in which the syphon has a drop leg having its base submerged in a container of the cleansed liquid, and suction means connected to the syphon via a valve.

12. An apparatus as claimed in claim 6 in which the syphon includes a priming valve admitting clean water to the syphon.

13. An apparatus as claimed in claim 1 in which the filtering medium comprises a secondary belt in addition to a primary belt, where both belts pass round the common drive roller and the secondary belt is provided with a separate smaller diameter tensioning roller, both belts being arranged in the form of a dish in the region of the immersion of the filtering medium in the contaminated liquid.

14. An apparatus as claimed in claim 1 including a centrifugal separator arranged to receive cleansed liquid and to return rejected liquid to the contaminated liquid.

15. An apparatus as claimed in claim 1 in which the cleaning means comprises a static array of water jets extending across the width of the filtering medium.

16. An apparatus as claimed in claim 15 in which the cleaning means includes a high pressure oscillating water jet across the width of the filtering medium.

* * * * *